United States Patent
Chang et al.

(10) Patent No.: US 8,463,678 B2
(45) Date of Patent: Jun. 11, 2013

(54) GENERATING METHOD FOR TRANSACTION MODELS WITH INDICATORS FOR OPTION

(75) Inventors: Chao-Hung Chang, Taipei (TW); Yen-Tseng Hsu, Taipei (TW); Jerome Yeh, Taipei (TW); Po-Lin Yeh, Taipei (TW); Yu-Tung Lin, Taipei (TW)

(73) Assignee: National Taiwan University of Science and Technology (TW)

( * ) Notice: Subject to any disclaimer, the term of this patent is extended or adjusted under 35 U.S.C. 154(b) by 0 days.

(21) Appl. No.: 13/197,055

(22) Filed: Aug. 3, 2011

(65) Prior Publication Data

US 2012/0290501 A1   Nov. 15, 2012

(30) Foreign Application Priority Data

May 13, 2011   (TW) .............................. 100116808 A

(51) Int. Cl.
*G06Q 40/00*   (2006.01)
(52) U.S. Cl.
USPC ............................................. 705/35; 705/37
(58) Field of Classification Search
USPC ..................................................... 705/35–45
See application file for complete search history.

(56) References Cited

U.S. PATENT DOCUMENTS 6,330,546 B1 * 12/2001 Gopinathan et al. ............ 705/35

OTHER PUBLICATIONS

Marose, Robert A., "A Financial Neural-Network Application", AI Expert, vol. 5, No. 5, May 1990, pp. 50-53, May 1990.*
ART 2—an unsupervised neural network for PD pattern recognition and classification B. Karthikeyan a, *, S. Gopal b, S. Venkatesh 2006.*

* cited by examiner

*Primary Examiner* — Richard C Weisberger
(74) *Attorney, Agent, or Firm* — Patterson & Sheridan, LLP

(57) ABSTRACT

The invention is to provide a generating method for transaction models with indicators for option. The method comprises: (S1) collecting a variety of indicators from the financial market; (S2) establishing an indicator pool saved with the indicators; (S3) distinguishing and classifying the indicators by Neural Network; (S4) determining a plurality of transaction models, the indicator of each transaction model in an independent classification; (S5) determining a date parameter for each indicator; (S6) deleting a part of the transaction models; (S7) determining a plurality of final transaction models from another transaction models; and (S8) determining a weight of each final transaction model.

10 Claims, 6 Drawing Sheets

GENERATING METHOD FOR TRANSACTION MODELS WITH INDICATORS FOR OPTION

BACKGROUND OF THE INVENTION

1. Field of the Invention

Figure 1:
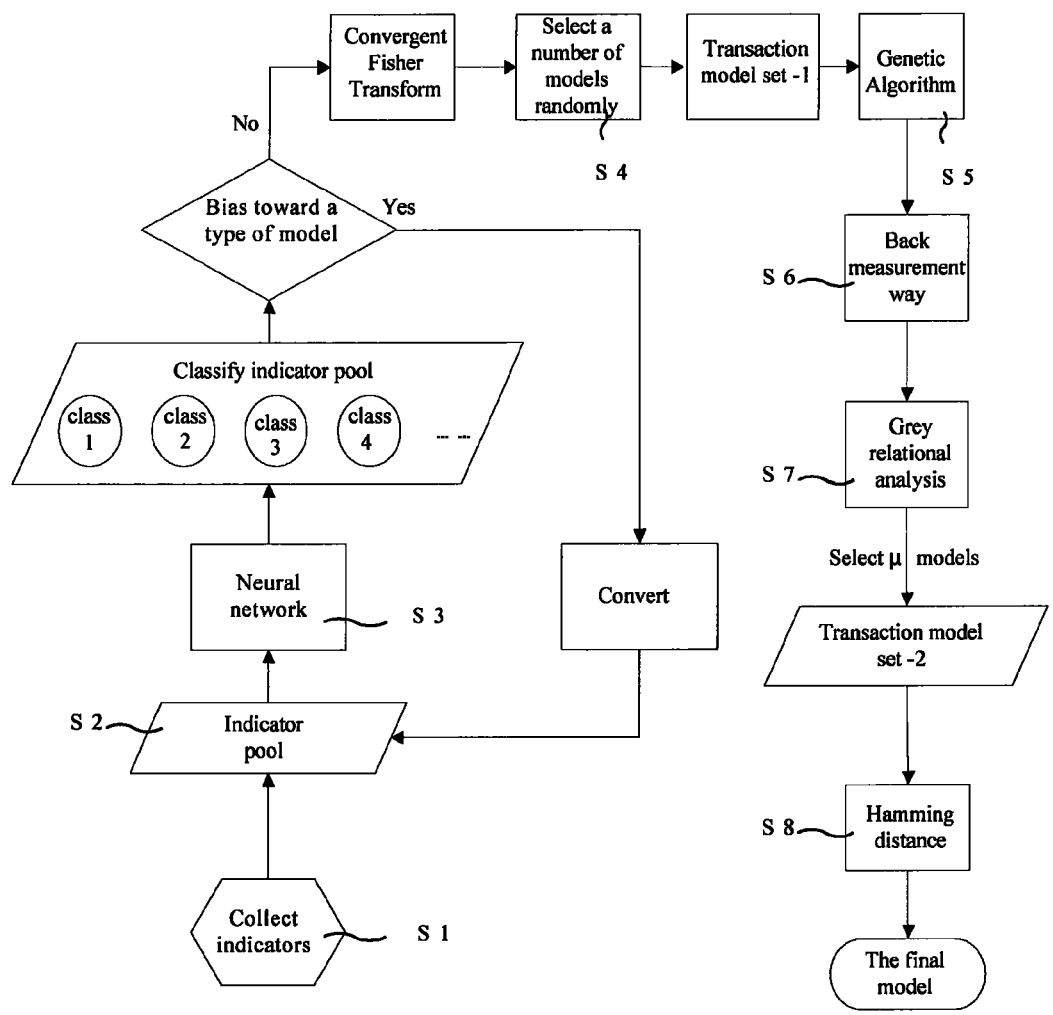

The invention is related to a generating method for transaction models with indicators for option by the artificial intelligence techniques.

2. Description of the Prior Art

Taiwan financial markets develop very well in recent years, wherein the options market is more representative. In the options market, investors need to maintain a certain amount of margin for having the opportunity to use a high degree of financial leverage to obtain the extraordinary profits, while the options also provide a hedge, therefore a lot of foreign money is attracted into Taiwan market as a hedge for making Taiwan financial market more active and healthy.

The analysis of the stock market generally is divided into fundamental analysis and technical analysis, wherein the fundamental analysis have many factors to be considered, including domestic and international political situation, the Government's policy on the stock market, economic development, financial profiles, the overall analysis of the public limited company, operating performance and stock market conditions and other capital flows. It is difficult to find out from the fundamental factors influencing the market trends and the regularity. Therefore the technical analysis can be widely used by the public. Technical analysis utilizes statistical and mathematical ways for summarizing some of the features based on the linear indices derived from the historical information such as stock price and trading volume, so as to predict the possible future direction of the market.

With the advance of computer technology, the program trading systems become new transactions in recent years. The program trading systems utilize computerized trading tools, technical analysis, fundamental analysis model, characteristics and periodic fluctuations in commodity prices or other information such as logical thinking, into the program code to generate a transaction model, as a basis of judging trends. The traders buy or sell according to the signal of the system, rather than their own views. Therefore, the systems exclude investors making unreasonable action of buying and selling because of the emotional reaction generated by the trends. In addition, the systems can also eliminate unnecessary operations by the uniform trading rules. The computer orders are gradually replacing the previous hit single man. Therefore, the program trading has become increasingly high proportion and attracted more and more attention both at home and abroad.

Because the investment develops very well in recent years, various new methods of technical analysis or indicators are constantly proposed and widely used. If the investor uses only one technical analysis method, the prediction of the trend of the market is bound to be not accurate, but if the investor uses a number of technical analyses, the investor suffers a loss when technical analysis methods in the trading signals shown conflicting. Meanwhile, the combination of technical indicators is often not the simple presentation that one plus one equals two, some may indeed be able to complement each other, but often they will interfere with each other. Therefore, how to integrate a number of technical indicators messages has become the urgent issue that the technology field faced, that is also the focus with many investors concerned.

SUMMARY OF THE INVENTION

The prior transaction models usually utilize one or two technical indicators, as a reference signal in the market trading after the common parameters are used, but the parameters are inconvenient to be adjusted and the small amount of indicators easily cause a bias, the market trade in the accordance with the prior transaction models will easily lead to financial losses. In view of the present issue, one scope of the present invention is to provide a generating method for transaction models with indicators for option. The present invention utilizes the artificial intelligence techniques to create a transaction model generator of transaction models with indicators for option. Because of the features of multi-indicators and multi-models, the present invention is able to be used with the common complex trading strategies. More specifically, the present invention utilizes the artificial intelligence technology for constructing the start-up of indicators, the transaction model and the final model and completing a transaction models with indicators for option which is able to have a good performance no matter in the stability, credibility, and all aspects of fitness, wherein the artificial intelligence techniques include neural networks, Genetic Algorithm, grey relationship analysis.

The main purpose of the present invention is to provide a program transaction model as a reference of the trading of option market for the investors by artificial intelligence techniques. The present invention can further help the public to increase profit and beat the market.

The second purpose of the present invention is to provide an application of a variety of academic technology into the market for achieving the results of academic and actual practice complement with each other.

In one embodiment of the present invention, a generating method for transaction models with indicators for option comprises the following steps of: (S1) collecting a plurality of indicators from the financial market; (S2) establishing an indicator pool saved with the indicators; (S3) distinguishing and classifying the indicators by a neural network; (S4) determining a plurality of transaction models, wherein the indicator of each transaction model is an independent classification; (S5) determining a date parameter for each indicator; (S6) deleting a part of the transaction models; (S7) determining a plurality of final transaction models from the other transaction models; and (S8) determining a weight of each final transaction model.

The objective of the present invention will no doubt become obvious to those of ordinary skill in the art after reading the following detailed description of the preferred embodiment, which is illustrated in following figures and drawings.

BRIEF DESCRIPTION OF THE APPENDED DRAWINGS

Figure 2:
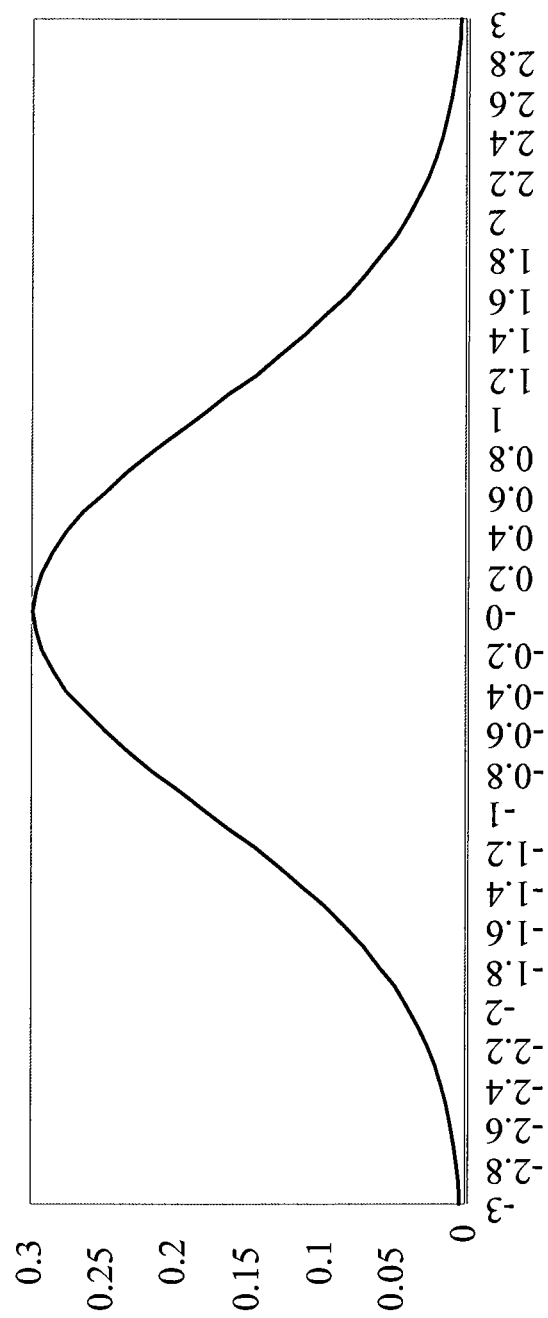
Figure 3:
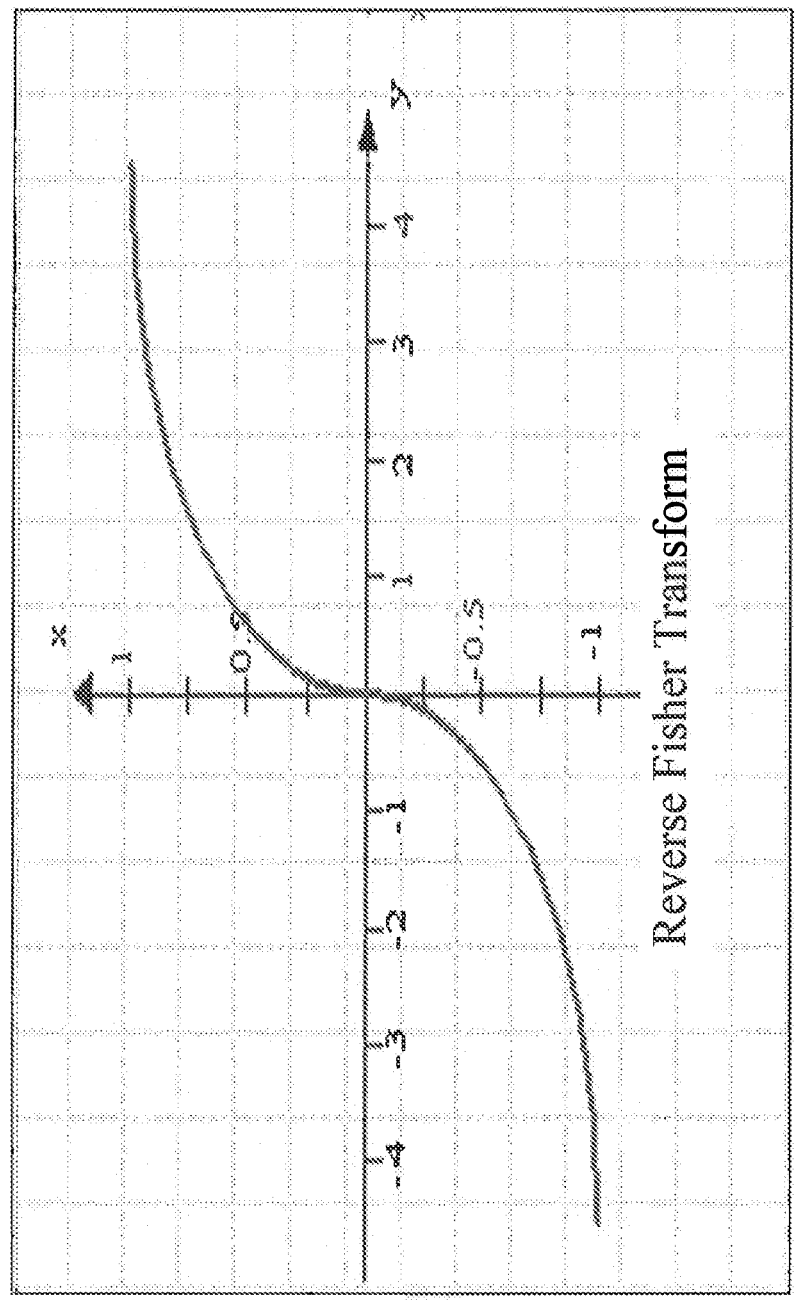
Figure 4:
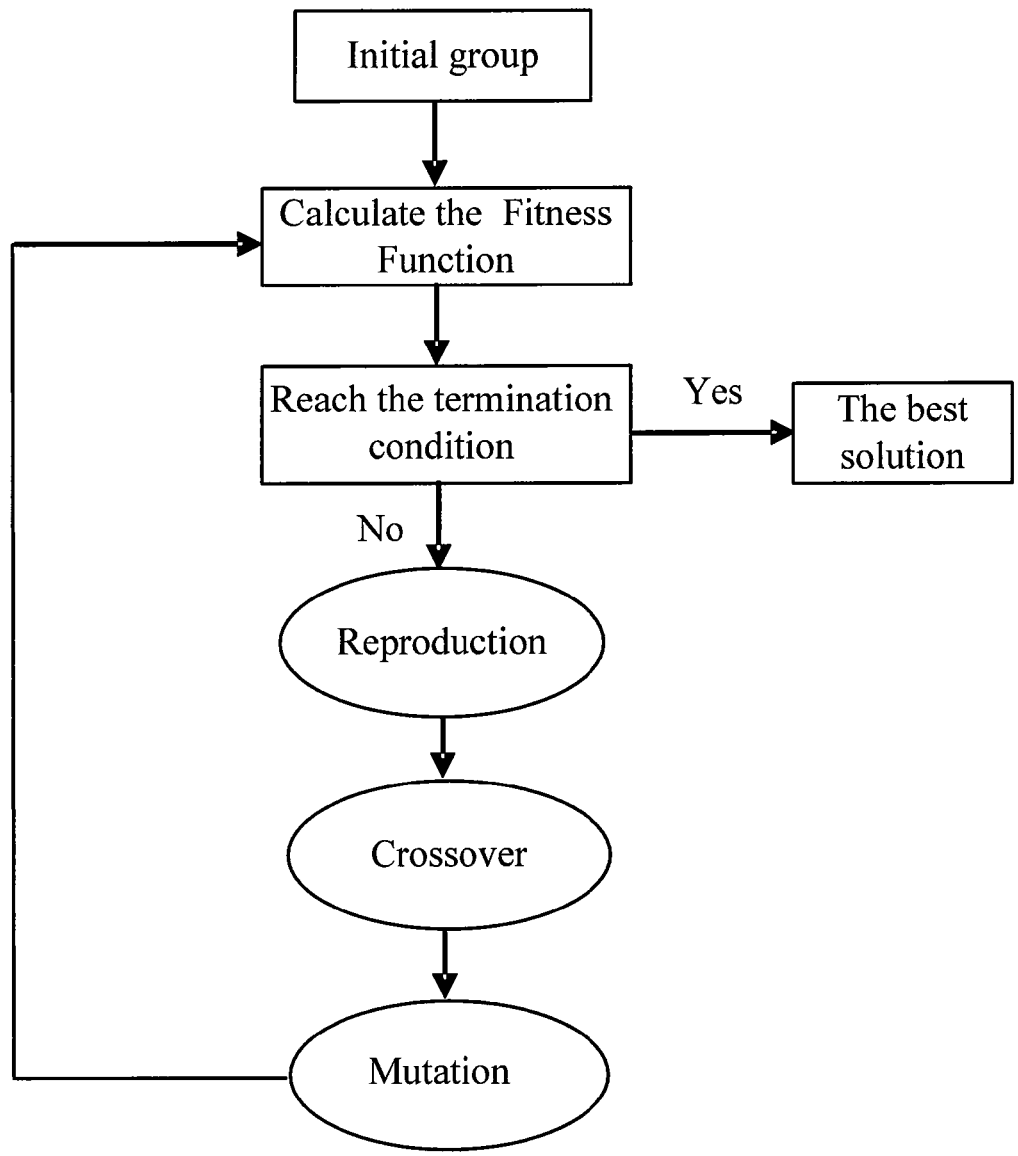
Figure 5:
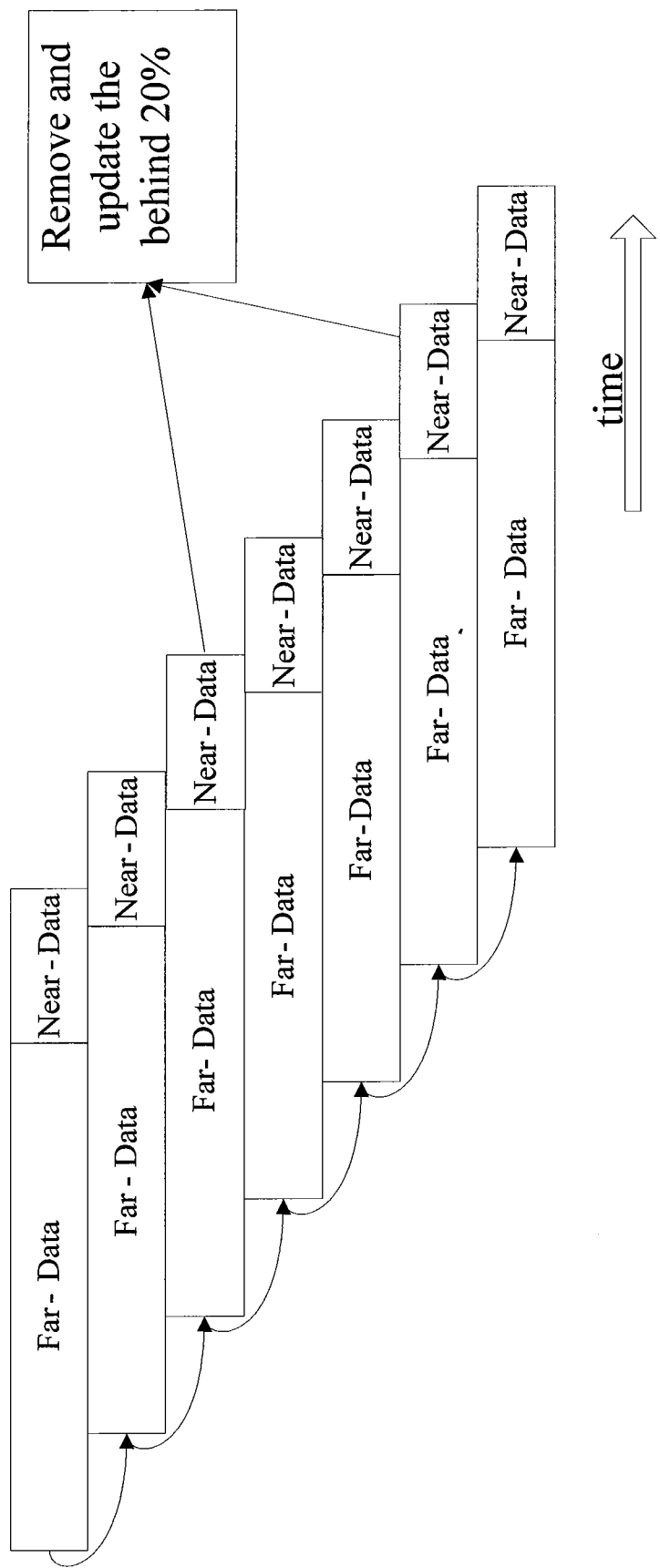
Figure 6:
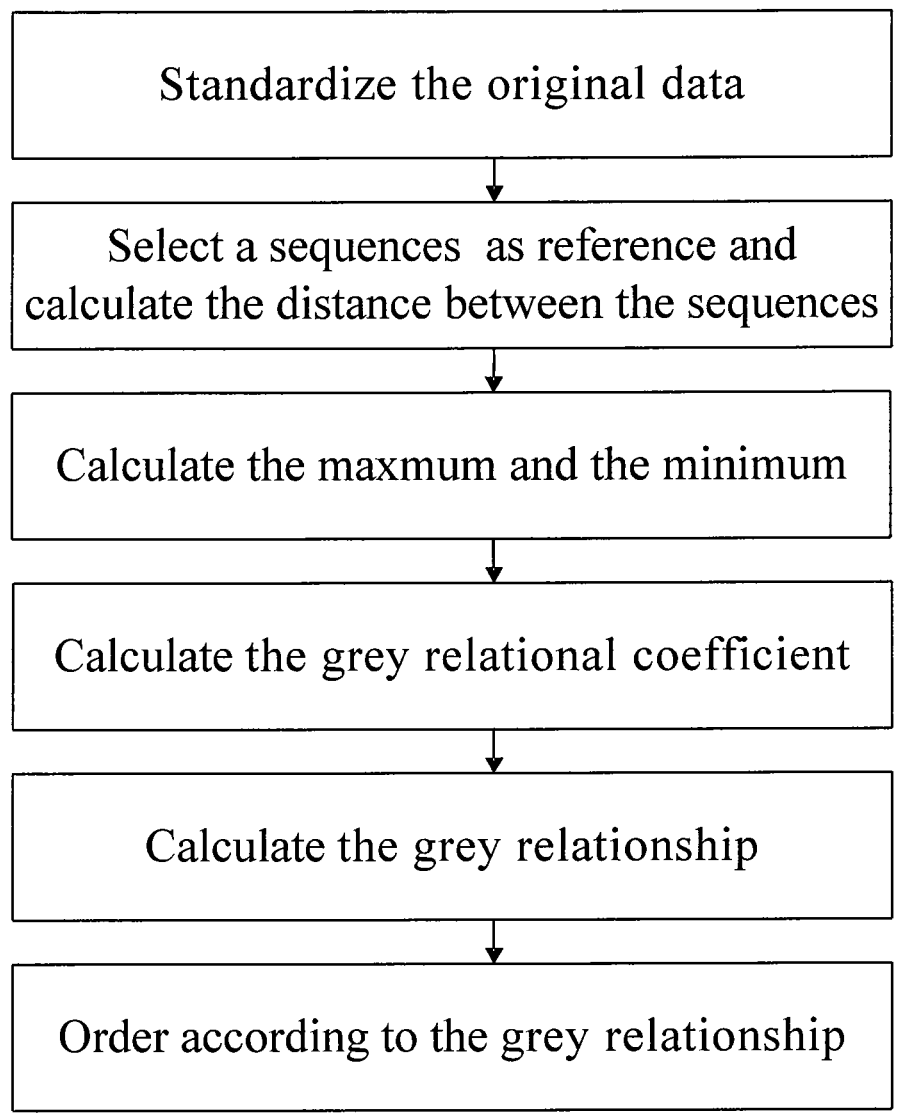

FIG. 1 is a flow diagram of an embodiment of the invention.
FIG. 2 is a Gaussian distribution diagram.
FIG. 3 is a standardized distribution diagram similar to Gaussian distribution.
FIG. 4 is a flow diagram of Genetic Algorithm.
FIG. 5 is a flow diagram of the overall process.
FIG. 6 is a flow diagram of the grey relational analysis.

DETAILED DESCRIPTION OF THE INVENTION

Please refer to FIG. 1 to FIG. 6. The present invention collects a plurality of indicators in different stocks from the financial market. Each indicator has a date parameter as the step of (S1).

And then, the present invention establishes an indicator pool saved with the indicators as the step of (S2). The indicators saved in the indicator pool will become the basic elements for generating a transaction model with indicators for option. Therefore, it is better while the variety and number of the indicators are more. But, for the purpose of balancing the distribution of the variety for preventing the problem of model type bias when the fundamental model is built, the present invention distinguishes and classifies the indicators by a neural network as the step of (S3). In the embodiment of the present invention, the indicators comprise the composite index number, trading volume, financing and short sale. The indicators can also comprise the index number of over the counter, trading volume, financing and short sale in other embodiment.

Since 1943, McCulloch and Pitts proposed the basic computing model of neural computation element, but such a neural computation element model is not widely used because the model did not have the ability of learning. Until 1949, a learning way was proposed by the Hebb, some experimental results in psychology were able to be explained. Thus the learning way was known as Hebbian learning rule. Since the neural network was applied more successfully in practice. Rosenblatt used the perceptron to work in character recognition, and Widrow and Hoff proposed adaptive linear element which has been widely applied in the signal processing. The neural network used by the present invention is ART-2, which can handle a continuous signal. ART-2 is a kind of Unsupervised Learning Network. The neural network of Unsupervised Learning Network is able to discover a plurality of important or negligible characteristics from the information in the absence of expected output value, so that the information was made as the clustering, the theory is described below:

The basic idea of design of ART-2 uses competitive learning and self-stabilizing learning mechanism. The system of ART-2 is divided into a F1 layer and a F2 layer. The F1 layer comprises seven sub-layer of W, X, U, V, P, Q and R. The signal S is inputted from the F1 layer, processed by the F1 layer and combined with the bottom-up weights bij as the input signal of F2. When the signal is inputted, the nodes of the F2 layer compete with each other, and generate the winning unit, and then return the signal to the F1 layer by tji. The system calculates a matching value of the input and tji and compares the matching value with a warning value in the F1 layer. If the matching value is greater than the warning value, the system changes the weight value of bij and tji; if the matching value less than the warning value, the system sends a reset signal to the F2 layer for restraining the winning unit, and finds other better units again in the F2 layer; if all the units in the F2 layer has been restrained, the system will generate a new processing unit, and set the weights.

The present invention gets a classified indicator pool by the following ART-2 process:

The values of the characteristics of the F1 layer:

$$u_i = \frac{v_i}{e + \|V\|} \tag{1}$$

$$w_i = s_i + au_i \tag{2}$$

$$p_i = u_i + dt_{Ji} \tag{3}$$

$$x_i = \frac{w_i}{e + \|w\|} \tag{4}$$

$$q_i = \frac{p_i}{e + \|p\|} \tag{5}$$

$$v_i = f(x_i) + bf(q_i) \tag{6}$$

-continued $$f(x) = \begin{cases} x & \text{if } x \geq 0 \\ x & \text{if } x < 0 \end{cases} \tag{7}$$

Step 1 is to initialize parameters and weight: a, b, c, d, e, α, ρ, wherein a=b; c and d must satisfy $$\frac{cd}{1-d} \leq 1;$$

the α is the learning rate; ρ is the warning value, the initial weights are $t_{0i}$=0, $$b_{i0} = \frac{1}{(1-d)\sqrt{n}},$$

wherein n is an example of the attribute number.

Step 2 is to apply several learning cycles from step 3 to 12 when entering an indicator of training examples.

Step 3 is to change the values of the characteristics of the F1 layer:
$u_i$=0; $p_i$=0; $q_i$=0; $w_i$=$s_i$;

$$x_i = \frac{s_i}{e + \|s\|};$$

$v_i$=f($x_i$)

Step 4 is to change the values of the characteristics of the F1 layer again, and calculating (1) to (6).

Step 5 is to calculate the values of the characteristics of the F2 layer:

$$y_j = \Sigma b_{ij} p_i \tag{8}$$

Step 6 is to apply step 7 to 8 when a reset value is true.

Step 7 is to find the maximum unit J from the characteristics of the F2 layer.

Step 8 is to test the warning value:
Calculating (1), (3) and $$r_i = \frac{u_i + cp_i}{e + \|u\| + c\|p\|} \tag{9}$$

If $\|r\|$<p−e, let $y_J$=−1, restrain the unit J and return step 5.
If $\|r\|$≧p−e, calculate (2), (4), (5), (6) and process step 9.

Step 9 is to apply step 10 to 12 again and again.

Step 10 is change the weight value of the unit J.

$$t_{Ji} = adu_i + [1 + ad(d-1)]t_{Ji} \tag{10}$$

$$b_{iJ} = adu_i + [1 + ad(d-1)]b_{iJ} \tag{11}$$

Step 11 is to change the values of the characteristics of the F1 layer, and calculating (1) to (6).

Step 12 is to test if the times of changing weight reaching the pre-set number.

Step 13 is to test if the times of learning cycles reaching the pre-set number.

After the classification of the ART-2, the classified indicator pool is generated, and in the classified indicator pool, the present invention further uses a Fisher Transform as a way to improve the performance of the indicators. Gaussian Probability Distribution Function is commonly used in simulating the stock market information, but in fact the stock market data is rarely shown as the general distribution as FIG. 2, wherein one of the reasons for many technical indicators cannot successfully simulate as expected.

To solve this problem, the present invention uses a convergent Fisher Transform for converting a variety of probability distribution curves to a distribution similar to Gaussian distribution. The conversion equation is shown as follows:

Inverse Fisher Transform (IFT):

$$x = \left[\frac{e^{2y}-1}{e^{2y}+1}\right] \quad (12)$$

The trading price of option or the value of indicator must be standardized to the value between +1 and −1 as being the input, the output result as shown in FIG. 3. When the input value is close to the average, the output will approach zero; conversely when the input value is close to extremum (+1 or −1), the output will be significantly strengthened. Thus, the noise appeared frequently and originally will be filtered, the turning points of indicators peak will become relatively minority events, which highlight the real linear twist and give clearer instructions while buy or sell.

After completing the collection, classification and strengthening of indicators, two to four indicators are taken as a group, selected randomly into several transaction models. In each model, indicators cannot belong to the same classification as the step of (S4). Because each indicator has its outstanding place, it may have a particularly good performance in the rising session, the sagging session or the correcting session. However the performance in other session may be disappointing. After classification, the outstanding and failed performance of the indicators in the same class may be mutually same. If the model comprises the same types of indicators, the model will be limited in certain sessions rather than adapting to the rapidly changing stock market and bring out a similar model.

Then, processing the step of (S5) determining a date parameter for each indicator. In each model, each indicator has its own date parameters. Each proportion of the indicator in the model is also the decision-making power intensity of buying, selling, liquidation, or no-action, which are represented by the weight parameter. The present invention utilizes Genetic Algorithm to decide these parameters, the flow diagram is shown in FIG. 4. The above parameters are regarded as a chromosome and a fitness function is generated from the parameters of Total Net Profit (TNP), Percent profitable (PP), Profit Factor (PF) and Duty Ratio (DR), which are assessed by the model, in accordance with the following equation:

$$f(x) = \frac{TNP \times PP \times PF}{DR}, \quad (13)$$

and the fitness of the chromosome is calculated based on the results. Although Genetic Algorithm can only find the approximate solution, but in fact a true optimal solution is not needed. Because the excessive optimization may be overfitting, and these parameters after the process of the present invention will gradually weaken its influence. Thus, the only thing is to find the approximate solution.

Even utilizing Genetic Algorithm to find the best parameter solution, the performance of some models may still be unsatisfactory, these part of the models must be removed no matter the reason is the composed that the indicators are in conflict with each other, or any other reason. Therefore, an assessment process is required to determine whether the model generated at this stage should be removed, the present invention utilizes a back measurement way to determine the fate of the model as the step of (S6). The method is setting a fixed length of Far-Data interval and Near-Data interval, the Far-Data interval is an interval of the past time; the Near-Data interval is an interval close to the current time, the performance of the Far-Data interval and the Near-Data interval start to calculate from a certain point in past time, as the time forward, the Far-Data interval and the Near-Data interval will advance to the current time point. Each performance of the Far-Data interval and the Near-Data interval generated will calculate their scores with equation (13), and calculate the final score with the rate of Near-Data×60%+Far-Data×40%. A model will be removed when the model is in the behind of 20% in a period, the overall process is shown in FIG. 5.

After establishing a number of models, too much alike models also must be avoid, but in fact, between the various quality models, most of the profit place and the loss place are repeated. After the optimization by Genetic Algorithm and the assessment by the back measurement way, a number of models will have a certain similarity. Therefore, the present invention utilizes the grey relational analysis in the grey system theory to select a plurality of final transaction models from the other transaction models as the step of (S7).

In the grey relational analysis, Grey relational grade is defined as the association between two sequences. In calculating the grey relational grade, if only a sequence $x_0(k)$ is selected as a reference sequence, is called "Localized Grey Measure." If any one of the sequences $x_i(k)$ can be as a reference sequence, is called "Globalized Grey Measure." In the embodiment of the present invention, the grey relational analysis is based on the grey relationship of the distance between the sequences, the grey relationship of the slope between the sequences, the grey relationship of the area between the sequences or the combination of the grey relationship.

Since the invention is based on a realized and unrealized profit curve of a model as a reference sequence to calculate the relationship of the other models, the method utilized to calculate the relationship is "Localized Grey Measure."

First calculate the absolute distance $\Delta_{0,i}(k)$ between $x_i(k)$ and $x_0(k)$, wherein i=1, . . . , m. k=1, . . . , n∈N, then calculate a distance grey relational coefficient $\xi_{0,i}(k)$ in all the point by comparing the sequences $x_i$ with the reference sequences $x_0$, and last calculate a grey relationship of the distance $\gamma^{0,i}$ between the sequences $x_i$ and the sequences $x_0$.

$$\xi_{0,i}(k) = \frac{\Delta\min + \zeta\Delta\max}{\Delta_{0,i}(k) + \zeta\Delta\max} \quad (14)$$

$$\gamma^{0,i} = \gamma(x_0, x_i) = \frac{1}{n}\sum_{k=1}^{n}\xi_{0,i}(k) \quad (15)$$

wherein $$\Delta_{0,i}(k) = |x_0(k) - x_i(k)| \quad (16)$$

$$\Delta_{max} = \max_i \max_k \Delta_{0,i}(k) \quad (17)$$

$$\Delta_{min} = \min_i \min_k \Delta_{0,i}(k) \quad (18)$$

i=1, 2, . . . , m  k=1, 2, . . . , n

The flow diagram is shown in FIG. 6. The grey relational coefficient ξ is a real number between 0 to 1. Summing up the grey relationship of the realized and unrealized profit curve of each model to other models can get $\gamma_{sum}(j)$, j=1, 2, . . . , m, and last selecting a number of models in the front minimum $\gamma_{sum}$ to consist the final transaction model.

When the multi-models are applied, which are more indicators, to make decisions, the majority rule is not a good way because each model has its own section. A simple voting system cannot be revealed by individual characteristics in a rapidly changing stock market. So the present invention uses a weighted voting system to solve this problem. The weighted voting system is that each model of the composition of the final transaction model voting for the sale of the investment will no longer be simple to a ticket of buying, selling or liquidation, which is the first type of equality, but according to the performance of the model so far converse the voting weight, the model of good performance has a higher decision power naturally, but also to be considered such a mechanism may ultimately lead to "a dominant mode" of the situation, therefore, the present invention utilizes Hamming distance for determining a weight of each final transaction model as the step of (S8).

Let the domain is U, $U(k) = \{u_1(k), u_2(k), u_3(k)\}$, k=1, 2, . . . , μ, $u_1$ represents a set of cumulative winning percentage of the day; $u_2$ represents a number of points of cumulative profits of the day; $u_3$ represents a number of times of cumulative continuous outcome of the day. The number of points of cumulative profit of the day and the number of times of cumulative continuous outcome of the day are all be standardized to the value between 0 to 1, the equation is shown as follows:

$$u_2(k) = \frac{u_2^*(k)}{\max[u_2^*(k)]}, k = 1, 2, \ldots, \mu \quad (19)$$

$$u_3(k) = \frac{ConL(k)}{ConW(k) \times \lambda}, k = 1, 2, \ldots, \mu \quad (20)$$

Here ConL(k) represents the number of cumulative continuous losing of the day; ConW(k) represents the number of cumulative continuous winning of the day, every successful transaction would let the number of cumulative continuous winning of the day plus one, and the reverse is also true; μ represents the number of models; λ is an adjusting parameter for letting the value of $u_3(k)$ maintain between 0 to 1.

Clearly, the cumulative winning percentage and number of points cumulative profits are higher the better, thus to avoid "a dominant mode", the conception of the number of times of cumulative continuous outcome is joined, through (20), it can be seen as the number of cumulative continuous winning of a model increasing, the weight of the model will gradually decrease; at the same time a counter is added to record the number of times of each model getting the maximum weight, as long as the number is more than a threshold, the weight of the model is reduced. In fact, the design of the number of times of cumulative continuous outcome and the number of times of each model getting the maximum weight also represents a model cannot always be the winner in the rapidly changing market.

Assume a best fuzzy set $$A = \frac{1}{u_1} + \frac{1}{u_2} + \frac{1}{u_3},$$

the day U(k) and the Hamming distance A are the day weight of each model, then multiplied by the operation signal of the day (buying, selling, or liquidation) of each model and added up to a total, the total is an original operation signal of the final transaction model of the day, and last utilize the following way for deciding the investment.

The buying point: $\Sigma \geq \mu \times \sigma_{(Buy)}$
The selling point: $\Sigma \leq -\mu \times \sigma_{(Sell)}$
The liquidation or waiting: others Here Σ is the original operation signal of the final transaction model of the day; μ represents the number of models; $\sigma_{(Buy)}$ and $\sigma_{(Sell)}$ are the threshold adjusting parameter for determining the sensitivity to investment of the final transaction model.

Although the present invention has been illustrated and described with reference to the preferred embodiment thereof, it should be understood that it is in no way limited to the details of such embodiment but is capable of numerous modifications within the scope of the appended claims.

What is claimed is:

1. A generating method for generating a result transaction model, the result transaction model being utilized to evaluate the performance of a financial market of option in accordance with a plurality of indicators so as to evaluate an operation signal thereof, comprising the following steps of:
   (S1) collecting the plurality of indicators from the financial market, each of the plurality of indicators comprising a date parameter respectively;
   (S2) distinguishing and classifying the plurality of indicators into different groups by a neural network, each of the plurality of groups forms a transaction models respectively;
   (S3) picking some of the transaction models from the plurality of transaction models randomly while each of the picked transaction model being in the different groups;
   (S4) determining, by a computer processor, the date parameter for each of the plurality of indicators of the transaction models being picked in (S4);
   (S5) removing at least one transaction model from the plurality of transaction models being picked in (S4) in accordance with the performance thereof;
   (S6) picking a plurality of final transaction models from the transaction models not be removed in (S6); and
   (S7) determining, by a computer processor, a weight of each of the plurality of final transaction models in the result transaction model so as to form the result transaction model thereby, which the result transaction model being capable of being utilized to evaluate the operation signal.

2. The generating method of claim 1, wherein the neural network is an unsupervised learning network.

3. The generating method of claim 1, wherein the indicators comprise composite index number, trading volume, financing or short sale.

4. The generating method of claim 1, wherein the indicators comprise index number of over the counter, trading volume, financing or short sale.

5. The generating method of claim 1, wherein the step of (S5) utilizes Genetic Algorithm for determining a date parameter for each indicator.

6. The generating method of claim 1, wherein the step of (S6) utilizes a back measurement way for removing at least one transaction model from the plurality of transaction models.

7. The generating method of claim 1, wherein the step of (S7) utilizes a grey relational analysis to pick the plurality of final transaction models.

8. The generating method of claim 1, wherein the step of (S8) utilizes Hamming distance to determine a weight of each of the plurality of final transaction models in the result transaction model.

9. The generating method of claim 7, wherein the grey relational analysis is based on the grey relationship of the distance between the sequences, the grey relationship of the slope between the sequences, the grey relationship of the area between the sequences or the combination of the grey relationship.

10. The generating method of claims 1 to 7, wherein the weight is multiplied by the operation signal of the day of each final transaction model and added up to a total, the total is an original operation signal of the day.

* * * * *